Feb. 20, 1923.

P. A. P. V. MAUCLÈRE 1,446,263

SAFETY SYSTEM FOR STORING INFLAMMABLE LIQUIDS

Filed Feb. 19, 1920    3 sheets-sheet 1

INVENTOR:
Pierre André Paul Victor Mauclère
By Attys
Fraser, Turk & Myers

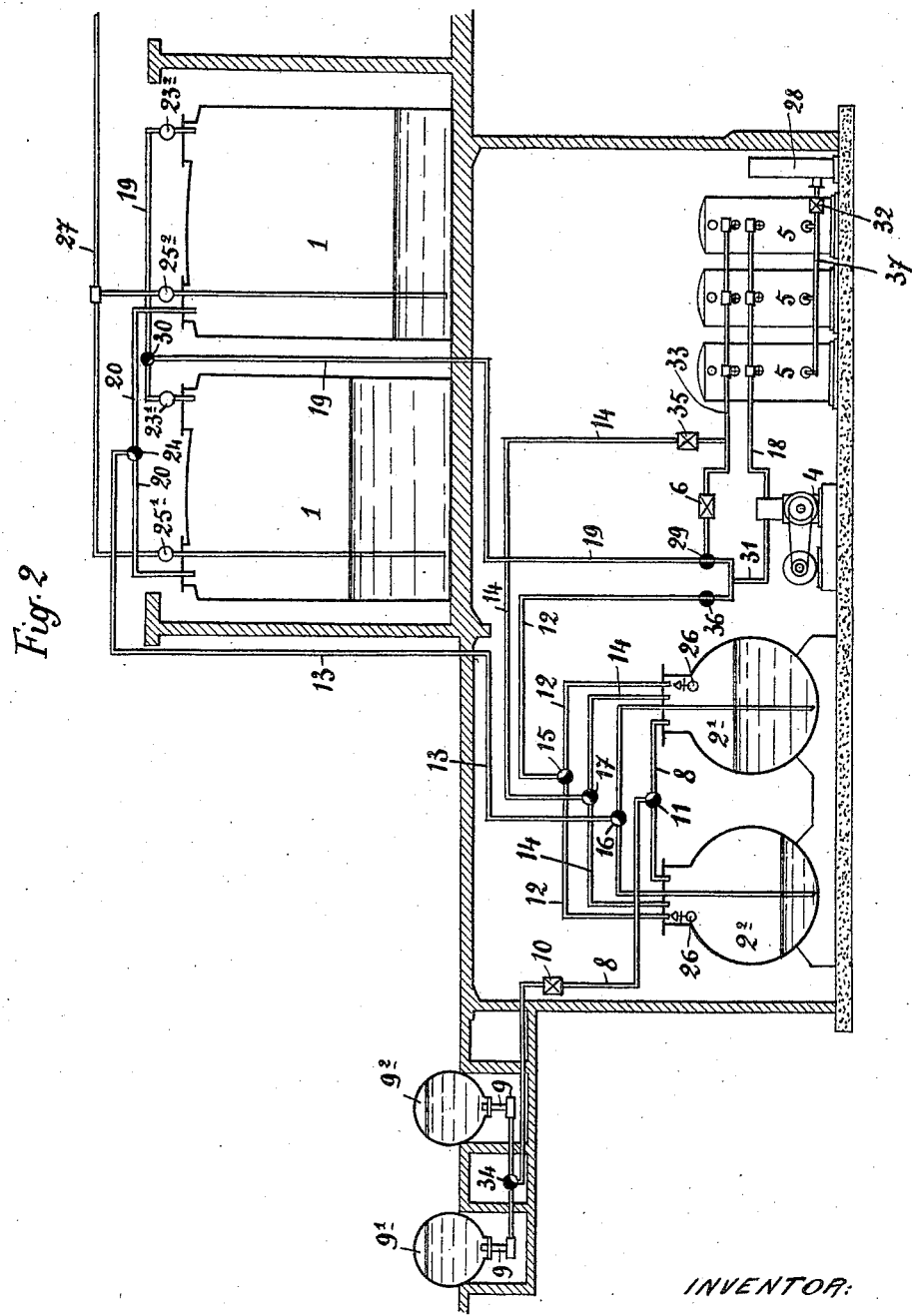

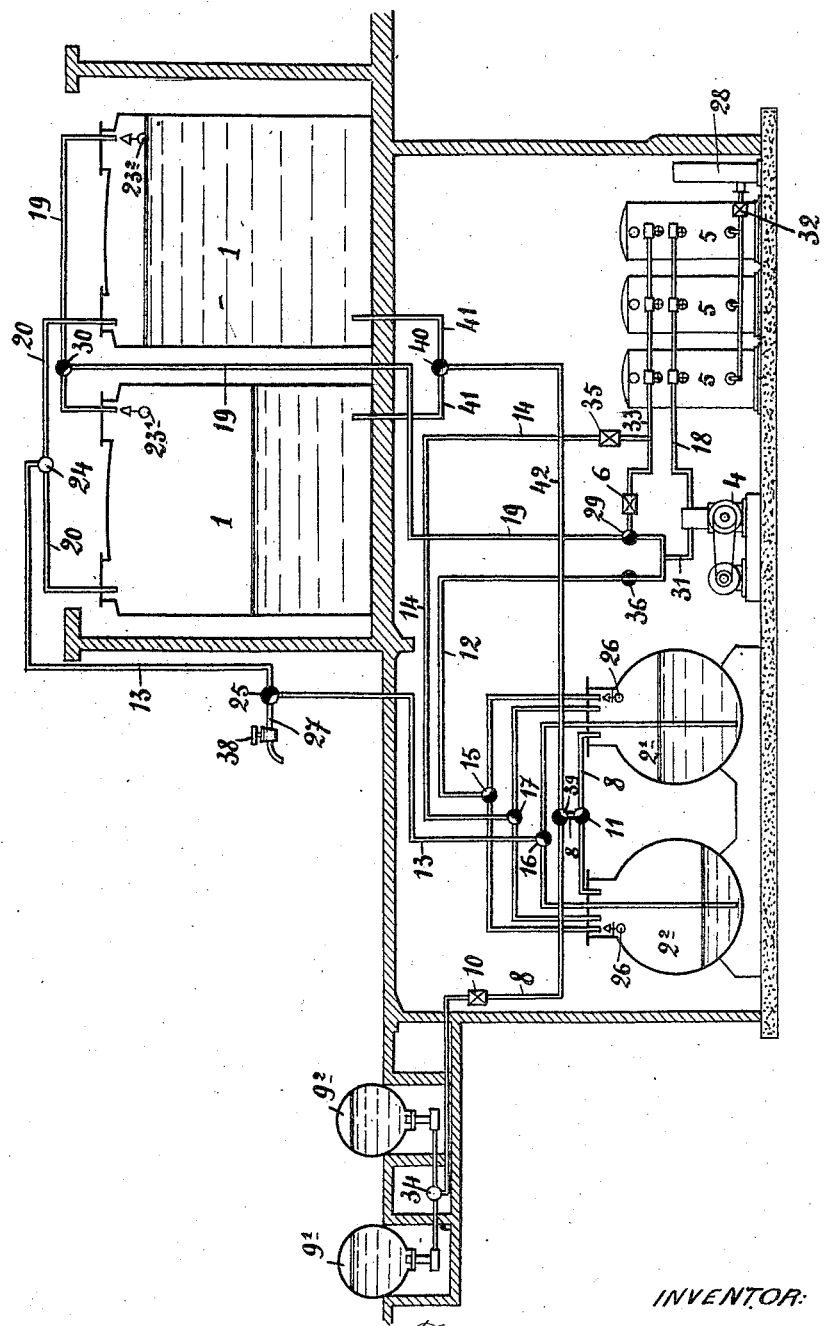

Patented Feb. 20, 1923.

1,446,263

UNITED STATES PATENT OFFICE.

PIERRÉ ANDRÉ PAUL VICTOR MAUCLÈRE, OF PARIS, FRANCE.

SAFETY SYSTEM FOR STORING INFLAMMABLE LIQUIDS.

Application filed February 19, 1920. Serial No. 359,972.

*To all whom it may concern:*

Be it known that I, PIERRÉ ANDRÉ PAUL VICTOR MAUCLÈRE, a citizen of the Republic of France, residing in the city of Paris, Republic of France, have invented certain new and useful Improvements in Safety Systems for Storing Inflammable Liquids, of which the following is a specification.

In the United States Patent No. 1,097,470 of May 19th, 1914, Messrs. Rolland and Mauclère have described a safe system of manipulation of liquids by means of variation in the pressure of an inert gas acting upon liquids contained in reservoirs or tanks built on a low level, said gas being utilized in a closed pipe circuit so as to avoid losses.

The present invention has for its object a safety system for the manipulation of liquids in contact with an inert gas, essentially characterized in that the gas in contact with the liquid is always maintained at atmospheric pressure in the storage tanks either during the operation of storage or distribution or during the periods of inaction.

The safety of the system results from the special disposition of the apparatus, piping and taps, and particularly from the fact that the liquid, always protected from contact with air, is maintained exclusively in contact with a suitable inert gas or gaseous mixture, which is utilized in a closed piping circuit.

The system particularly allows existing plants to be transformed in a very simple manner into safety installations, without entailing a modification of the storage tanks for the liquids.

The storage plant which is the object of the present invention comprises on one hand one or several storage tanks and on the other hand a set of two small intermediate conjugate tanks, of same capacity, intended to receive the liquid to be stored, before its introduction in the storage tanks, and a battery of gas reservoirs for storing the gas.

The installation is completed by an arrangement of pumps, piping and taps, operated by hand or otherwise, with which all the operations of manipulation of the liquids can be performed without bringing said liquid in contact with the air, under the protection of the inert gas, said gas being utilized in a closed piping circuit.

According to the arrangement adopted, the passage of the liquid from the intermediate conjugate tanks to the storage tanks can be effected either by means of pumps or by exerting alternatively by means of gas from the gas reservoirs, a suitable pressure in the intermediate tanks.

The installation can be completed by means of piping, and taps allowing the intermediate combined tanks to be used, besides the storage operations, for the distribution of the liquid from the storage tanks.

Referring to the drawings filed with the present application, three manners of carrying out this invention are shown.

Fig. 2 represents a modified plant in which the liquid is forced in the storage tanks by the pressure of gas issuing from the gas reservoirs.

Fig. 3 represents another modification of this plant in which the intermediate tanks are adapted to be made use of for distributing liquid from the storage tanks besides being used for the storage of the liquid.

Figure 1:
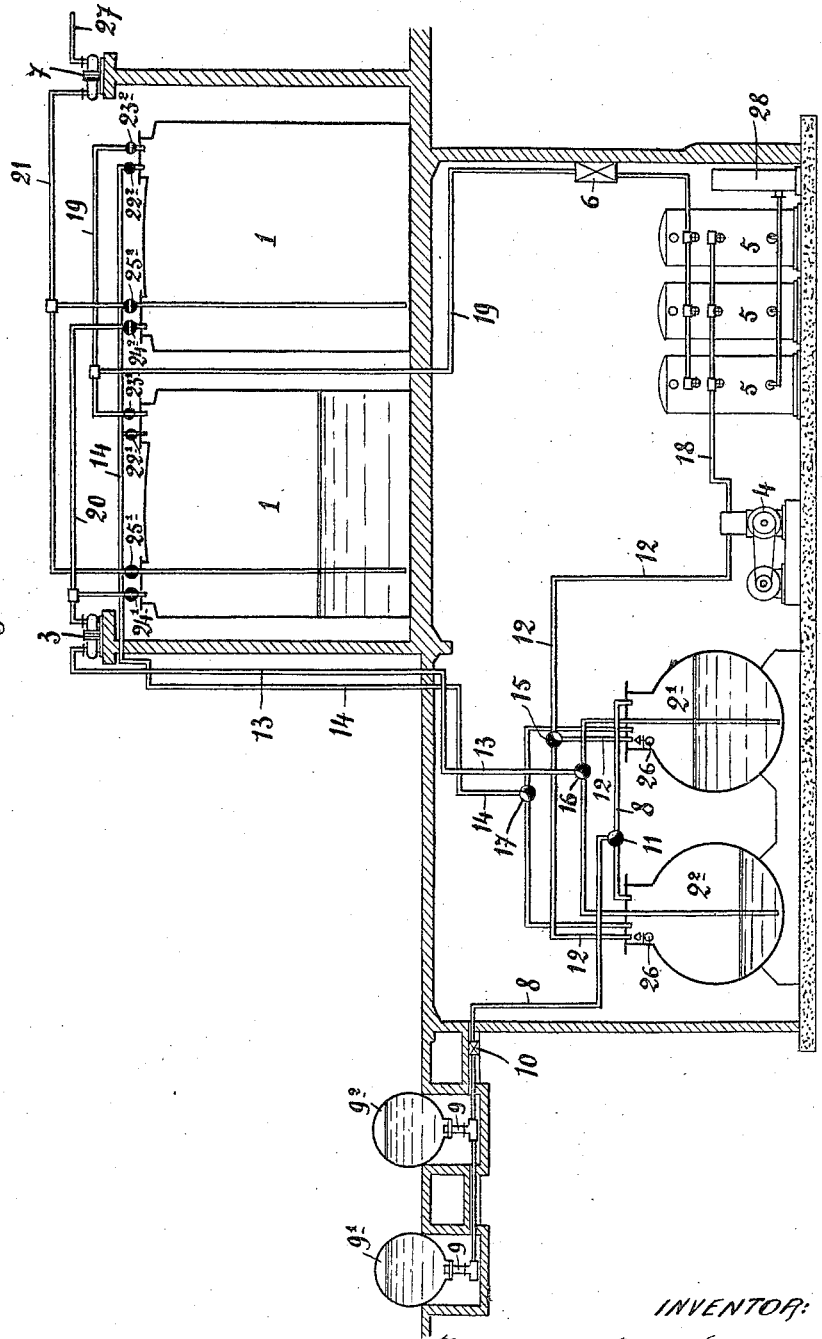
Fig. 1 shows diagrammatically the whole of a storage plant with two tanks for the storage and distribution of liquids, by means of ordinary pumps.

As seen in Fig. 1, the installation comprises one or more large storage tanks 1 and a pair of small intermediate conjugate tanks $2^1$ and $2^2$ having the same capacity. These two tanks $2^1$ and $2^2$ are intended to receive, by the pipes 8, the liquid from the casks $9^1$ and $9^2$, preliminary to its storage in the tanks 1, said casks $9^1$ and $9^2$ being connected to the pipe 8 by air tight joints.

A valve 10 connected to the pipe 8 is adapted to prevent the penetration of air into the intermediate tanks $2^1$ and $2^2$, when the liquid from the casks $9^1$ and $9^2$ has been emptied. This apparatus comprises any suitable valve such as a spherical, float, catch valve, or the like.

A battery 5 of high pressure gas reservoirs permits on one hand the inert gas pumped up by the compressor 4 through the pipe 12 into the intermediate tanks $2^1$ and $2^2$, and forced through the pipe 18 to be preserved without loss, and on the other hand, to fill the storage tanks 1 with inert gas, at atmospheric pressure through the pipe 19 and the expansion valve 6. The circulation of the gas takes place in a closed pipe circuit. Means for replenishing the gas cylinders 5 are provided, and comprises a gas cylinder filled under pressure with the inert gas, or a generator 28 for said gas, so as to compensate for the loss of gas through dissolution in the stored liquid.

A pump 3 pumps through pipe 13 the liquid alternately contained in the two intermediate tanks $2^1$ and $2^2$. This liquid is then forced through pipe 20 into the storage tanks 1. Another pump 7 pumps through pipe 21, the liquid contained in one of the storage tanks 1. This liquid is then forced through pipe 27 to the point where it is required to distribute it. These two pumps for the liquid are placed at a higher level than the highest level of liquid in the storage tanks 1 so as to avoid any undesirable leak of liquid through pipes 13 or 27.

The empty spaces of the storage tanks 1 and of the intermediate tanks $2^1$ and $2^2$ can be made to communicate by means of pipe 14 and of a suitable arrangement of taps.

Three way taps 11, 15, 16, 17, are adapted to regulate alternately the operation of storage and pumping of the liquid in and from the intermediate tanks $2^1$ and $2^2$. The pipes 14, 19, 20, and 21 branch off in as many distinct branch pipes as there are storage tanks and each branch is provided with taps such as $22^1$, and $22^2$, $23^1$ and $23^2$, $24^1$ and $24^2$, $25^1$ and $25^2$, adapted to shut off communication between the corresponding tank and the rest of the installation.

In order to avoid any pumping up of the liquid by the compressor 4, the intermediate tanks $2^1$ and $2^2$ are each provided with a float valve 26 or some other suitable device which closes the opening of the pipe 12 when the filling of these tanks is complete.

The working of the installation shown in Fig. 1 is as follows:—

When not in operation the storage tanks 1 contain some liquid in contact with the inert gas which fills the empty space above the liquid and is at atmospheric pressure. All the taps $22^1$, $22^2$, $23^1$, $23^2$, $24^1$, $24^2$, $25^1$ and $25^2$ are shut; the intermediate tanks $2^1$ and $2^2$, and the pipes 8, 12, 13 and 14 are full of inert gas at atmospheric pressure.

In order to store the liquid after having connected the casks $9^1$ and $9^2$ to the air pipe 8 by the air tight connections 9, the three way tap 11 is placed in such a position that pipe 8 communicates with the intermediate tank $2^1$, say, which it is intended to fill. The liquid flows from the casks into this tank, the compressor 4 meanwhile pumping back into the reservoirs 5 the inert gas contained in the tank $2^1$, by means of pipe 12, and of the three way tap 15, placed in a suitable position.

When the tank $2^1$ is full of liquid, the compressor 4 is stopped and the three way taps 11 and 15 are turned into such a position as to put pipes 8 and 12 into communication with the second intermediate tanks $2^2$. The three way taps 16 and 17 are then turned so as to put pipes 13 and 14 in communication with the intermediate tank $2^1$, which is full of liquid. The compressor 4 is started together with the pump 3, after having opened the taps provided on the branches from the pipes 14 and 20 which correspond to the tank 1 in which the liquid is to be stored, say, taps $22^1$ and $24^1$. The filling of the second intermediate tank $2^2$ takes place while the emptying of the first intermediate tank $2^1$ is performed. The liquid contained in the latter tank is pumped into the storage tank 1 and is replaced by an equal volume of inert gas at atmospheric pressure, issuing from the tank 1 through pipe 14 and the three way tap 17.

At the end of the operation, it is sufficient to manipulate again the three way taps 11, 15, 16 and 17 for performing the reverse operations and refill the first intermediate tank $2^1$ while the second tank $2^2$ is being emptied.

The operations follow one another in this manner alternately, as long as there is liquid in the casks $9^1$ and $9^2$ flowing in the pipe 8.

In order to distribute the liquid from any one of the storage tanks 1, it is sufficient to open the taps provided on the branches from the pipes 19 and 21, corresponding to the particular tank to be emptied, say taps $23^2$ and $25^2$, and to start pump 7, which pumps the liquid from this tank, while a corresponding quantity of gas from the gas reservoirs 5 expands to atmospheric pressure through the expansion valve 6 and replaces the liquid issuing from the storage tank 1.

The above described operations show that it is possible owing to the existence of the two pumps 3 and 7, and to the constant supply of gas from the gas reservoirs through the expansion valve, to simultaneously store and distribute liquid in and from the same storage tank 1. To this end it is sufficient to open all the taps provided on the branches of the pipes 14, 19, 20 and 21, which correspond to the particular storage tank, which is being operated upon.

It is to be noted that, as the filling of either of the intermediate tanks is slower than its emptying the pump 3 has a greater output than the compressor 4.

The working of the system, such as it is described theoretically above, necessitates numerous operations of taps and levers likely to be a cause of errors. In practice, it is therefore important to do away with isolated operations and to aim at as simple and automatic a system as possible.

The arrangement shown diagrammatically in Fig. 1 is adapted to the individual manual operation of the taps and of the starters corresponding to the compressor 4 and to the pumps 3 and 7.

In the manner of carrying out the invention shown in Fig. 2, the arrangement adopted is still such that the gas above the liquid in the storage tanks is maintained at atmospheric pressure. In this case, however, the ascent of the liquid from the intermediate conjugate tanks is obtained by admitting the gas under pressure alternatively in each of the said intermediate tanks, after these have been filled, the latter operation of filling these tanks from casks still taking place by mere gravitation under atmospheric pressure. The installation shown, Fig. 2, consists as before, of one or several large capacity tanks 1 for storing the liquid, with two intermediate conjugate tanks $2^1$, and $2^2$, adapted to receive the liquid from the casks in which it is supplied, a compressor 4, a battery of gas reservoirs, and a gas cylinder or a generator of gas under pressure 28, for compensating the losses due to the dissolution of gas in the liquid. This latter cylinder or generator 28 is connected to the gas reservoir 5 by the pipe 37 through the expansion valve 32.

A pipe 33 from the gas reservoirs 5 allows the storage tanks 1 to be supplied with gas at atmospheric pressure by the expansion valve 6 and the pipe 19; this same pipe allows a supply of gas, reduced to a suitable pressure by the expansion valve 35, to be admitted alternately to the intermediate tanks $2^1$ and $2^2$ by the pipe 14, in order to force the liquid from these tanks into the storage tanks 1.

Taps 36 and 29 allow to regulate the aspiration of the gas at atmospheric pressure contained in the intermediate tanks $2^1$ and $2^2$, and in the storage tanks 1 while the liquid is admitted in these tanks.

Pipes 12 and 13 allow the intermediate reservoirs $2^1$ and $2^2$ to be connected alternately with the compressor on one hand and the storage tanks on the other hand. Pipes 19 and 20 allow the storage tanks 1 to be connected with the compressor, on one hand and with the intermediate tanks on the other. The multi-way taps 15, 16, 17, 24 and 30, fitted to these pipes allow the required communications to be made when needed. The distribution of the liquid from the storage tanks 1 takes place through pipe 27. The taps $23^1$, $23^2$, $25^1$ and $25^2$ are taps for cutting off the particular tanks to which they are fitted from the rest of the installation.

The compressor is connected on one hand to the gas reservoir 5 by a pipe 18 and on the other hand to the intermediate tanks $2^1$ and $2^2$ and to the storage tanks 1 by a pipe 31 connected to both the pipes 12 and 19.

A pipe 8 controlled by multiple way taps 11 and 34 allows a connection to be made between the intermediate tanks $2^1$ and $2^2$, and the casks $9^1$ and $9^2$ through the air tight joints 9, to empty the casks, a suitable valve 10 preventing the air from entering the system when said casks are emptied.

The float valves 26 fitted to the intermediate tanks $2^1$ and $2^2$ prevent any liquid from being pumped up by the compressor 4.

The working of the apparatus shown in Fig. 2 is as follows:—

When not in operation, all the taps 11, 15, 16, 17, 34, $25^1$, $25^2$ and 30 are closed; one of the intermediate tanks, say $2^1$, is under atmospheric pressure, while the other $2^2$ together with pipe 14, contains inert gas at the required pressure for forcing the liquid from the intermediate reservoirs $2^1$ and $2^2$ into the storage tanks 1.

In order to store the liquid, after having connected the casks to the air tight joints 9, the taps 11 and 34 are placed so that one or the other of the casks $9^1$ or $9^2$ communicate by pipe 8 with the intermediate tank which is to be filled, and which is under atmospheric pressure, that is, in the present state of affairs, with $2^1$. The liquid from the casks flows then through the tap 34, pipe 8 and the tap 11, while the compressor, started at a suitable moment, pumps the inert gas of the tank $2^1$, through pipe 12 and taps 15 and 36, placed in a suitable position.

The float valve 26 closing itself automatically when the liquid rises to the top of the tank, prevents any liquid being pumped up by the compressor from this tank $2^1$.

Simultaneously with this operation of the filling of the tank $2^1$, the emptying of the conjugate tank $2^2$ takes place, the liquid contained in this tank being forced into the storage tanks 1 through pipe 13 and the taps 16 and 24, under the pressure of the gas from the reservoir 5, preliminarily expanded to a suitable pressure by passing through the expansion valve 35.

As the liquid so forced from the intermediate tank $2^2$ enters into one of the storage tanks 1, a volume of gas at atmospheric pressure equal to the volume of the liquid introduced in the tank, is pumped by the compressor 4 out of this storage tank through the pipe 19, the taps 30 and 29 suitably disposed and the pipe 31. This gas is then driven back by the compressor into the gas reservoirs 5 by means of pipe 18.

When the intermediate tank $2^2$ is empty, the operations proceeding in connection with these tanks are interverted, the liquid in the tank $2^1$ is forced into one of the storage tanks 1, while the liquid from the casks $9^1$ and $9^2$ pours itself into the reservoir $2^2$, the gas in which has been first brought back to atmospheric pressure by the compressor 4, pumping it up through pipe 12 and the taps 36 and 15 suitably disposed.

The operation of the taps required to obtain the above described reversal of working may be obtained by any suitable means.

For the emptying of the storage tanks 1, a pipe 27 and flow taps $25^1$ and $25^2$ are provided as in the former installation.

The installation shown in Fig. 3 comprises, as in the two arrangements previously described two or more storage tanks 1, two intermediate conjugate reservoirs $2^1$ and $2^2$, a compressor 4, a battery of reservoirs for gas under pressure 5 with a supply of gas for replenishing when required, a pipe 8 for emptying the casks $9^1$ and $9^2$, a sealing valve 10 to prevent the entry of air in the system, expansion valves 6, 35 and 32, a piping system 12, 13, 14, 18, 19, 20, 31, a valve system 11, 15, 16, 17, 29, 36, 24, 30 and 34 suitably situated on the piping and float valves 26, $23^1$, $23^2$ at the end of the inlet pipes of the compressor in the intermediate and storage tanks respectively.

In this case, however, the upper piping system for distribution of the liquid from the storage tanks is replaced by an inferior piping system, allowing the storage tanks to be placed directly in communication with one or the other of the intermediate tanks $2^1$ and $2^2$ one or the other of which are always being filled, through pipe 41 and taps 40 and 39, so as to distribute the liquid from the intermediate tanks through pipes 13 and 27, supplementary tap 25 and distribution tap 38.

To obtain through the tap 38 the flow of the liquid from the intermediate tank $2^2$, say, which is being used for filling the storage tanks 1, the tap 17 is disposed as shown so as to admit gas under pressure into the tank $2^2$ and cause thereby the flow of the liquid through pipe 13 and taps 16 and 25, suitably disposed.

The taps 40, 39 and 11 being disposed as shown, and the taps 15 and 36 suitably disposed, the compressor which aspirates gas by pipe 12 maintains the gas in the intermediate reservoir $2^1$, at atmospheric pressure so as to allow it to be filled by gravitation with the liquid from the storage tank 1. This liquid is replaced in the storage tank by an equal volume of gas at atmospheric pressure issuing from the reservoirs 5 through the expansion valve 6 and flowing through pipe 19 and taps 29 and 30 suitably disposed.

When the intermediate reservoir $2^2$ is nearly empty and its conjugate reservoir 21 is full, the position of the taps 11, 15, 16 and 17 is inverted so as to continue the distribution through tap 38 by means of the liquid from the intermediate tank $2^1$, while its conjugate tank $2^2$ is being filled by gravitation of the liquid from the storage tanks 1.

The operations of the new taps 40, 39 and 25 to obtain the above described flow of liquid at the distribution taps may be effected by any suitable means.

Having now particularly described and ascertained the nature of my said invention and in what manner the same is to be performed, I declare that what I claim is:—

1. A safety plant for the storage and distribution of inflammable liquids comprising a main liquid storage reservoir of relatively large capacity, a pair of intermediate tanks of relatively small capacity, means for supplying liquid to each of said tanks in alternation while transferring liquid from the other to said reservoir, a source of supply of inert gas, conduits connecting said gas supply with said reservoir and tanks whereby the portions unfilled with liquid may be filled with gas, means for causing gas to flow into or out of said reservoir and each of said cylinders as liquid flows out of or into the same respectively, and means for so controlling the pressure of gas admission and rate of flow relative to the rate of supply and transfer of liquid as to maintain the gas pressure in said system substantially uniform and not materially in excess of atmospheric pressure, all parts of said plant being sealed against the admission of air.

2. A safety plant, as specified in claim 1, including a gas compressor and suitable valved connections for withdrawing gas from either tank, when being supplied with liquid, and for returning said gas to the source of supply.

3. A safety plant, as specified in claim 1, including a pump located above the highest level to be attained by the liquid in said reservoir, and valved connections connected with said reservoir and pump, as means for distributing said liquid, means being also provided for supplying gas to said reservoir as liquid is withdrawn therefrom for distribution.

4. A safety plant, as specified in claim 1, including pressure regulating mechanism for controlling the admission of gas from the source of supply to other parts of the system.

5. A safety plant, as specified in claim 1, including means whereby the gas, which is caused to flow from the reservoir, as liquid is being transferred thereto from one of the intermediate tanks, may be fed to the tank from which the liquid is being withdrawn.

6. A safety plant, as specified in claim 1, having a pump located above the highest level to be attained by the liquid in said reservoir, and valved conduits connecting said pump, reservoir, and tanks, as the means for transferring liquid from said tanks to said reservoir.

In witness whereof, I have hereunto signed my name.

PIERRÉ ANDRÉ PAUL VICTOR MAUCLÈRE.

Witness:
 PIERRE DEPOOTE.